Feb. 1, 1949.   D. TROMPETER   2,460,553
ELECTRIC CURRENT THEFT PREVENTION MEANS
Filed Aug. 28, 1947
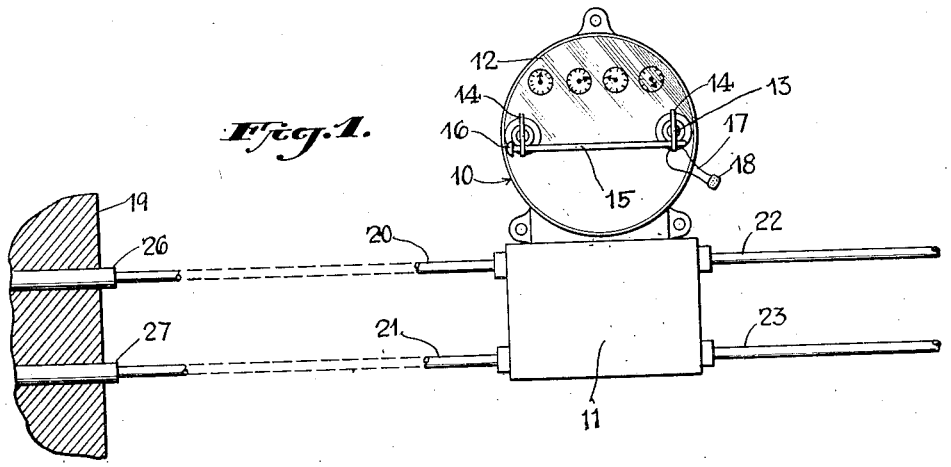
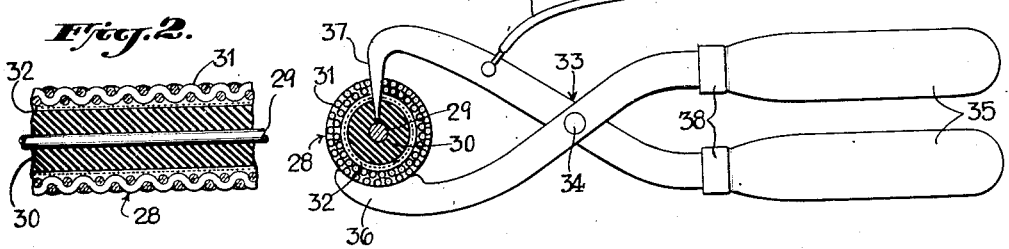
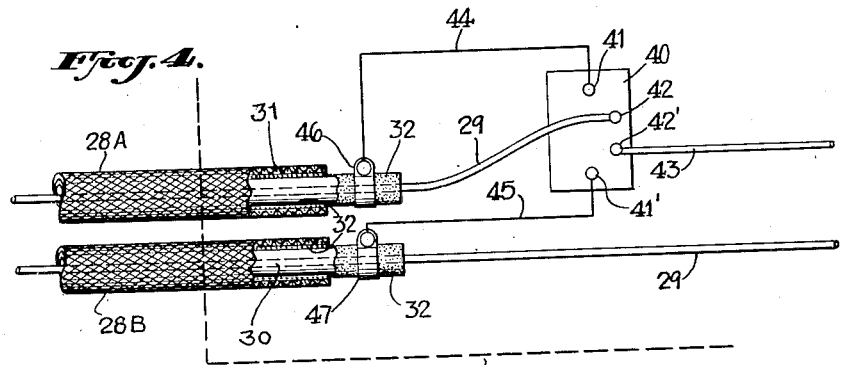
INVENTOR:
David Trompeter Patented Feb. 1, 1949

2,460,553

UNITED STATES PATENT OFFICE 2,460,553

ELECTRIC CURRENT THEFT PREVENTION MEANS

David Trompeter, Sandy Hook, Conn.

Application August 28, 1947, Serial No. 770,964

2 Claims. (Cl. 171—97)

The subject of this invention is an anti-theft protective means for public utility companies, and the aim of the invention, particularly, is to provide a simple, practicable and relatively inexpensive means for preventing the theft of electric current by diverting same from passing through a meter as the result of illicitly tapping into the leads to the meter.

As is well known, this species of thievery is a source of loss to the electric company, and such loss is a factor in increasing the just rates having to be charged honest patrons of the company.

An object of the invention is to provide a new type composite sheath for an electric wire, so characterized that when the usual insulation coverings for a plurality of wires needing to be tapped for the surreptitious stealing of electric current as above are disturbed to the extent to make such tapping possible the current supply circuit is immediately automatically broken. Such breaking of the circuit may be effected inside the meter, as by way of a fuse or mechanically operating circuit breaker locked in the sealed part of the meter.

As the invention is preferably carried out, a length of each of the wires constituting what is known as the intake to the meter, as to all such wires where they are not enclosed in metal conduits, is provided with a longitudinally extending auxiliary element, interposed between the usual rubber insulation around the conducting wire and the usual outer covering of tubular braiding or the like. This auxiliary element, below called the short circuiting conductor, may be a foil of a conducting metal or other conducting material, or a coating, film or closely distributed spattering or the like of a conducting material, as tin, carbon, or copper sulphate. The statements just made are by way of example only, the invention being independent of the material, form or manner of application or deposition of the short-circuiting conductor.

The invention will be more clearly understood, and the various objects, features and advantages thereof appreciated, from the following description of a now preferred embodiment of the invention as shown by way of exemplification in the accompanying drawing, in which Fig. 1 shows a familiar type of electric meter in a two wire circuit;

Fig. 2 is an enlarged, somewhat schematic axial sectional view, showing a now preferred structure to provide a composite sheath for a conducting wire according to the invention;

Fig. 3 illustrates a typical form of wire tapping implement, the same being shown as applied to the wire of Fig. 2; and Fig. 4 illustrates, generally diagrammatically, a manner of employing a number of lengths of said wire in connection with a meter in a two wire circuit, whereby on attempting to tap the wires ahead of the meter the previously closed or effective circuit beyond the meter will be broken within a sealed and locked portion of the meter.

A two wire system is illustrated, to simplify the disclosure; but obviously the invention is not to be so limited.

Referring to the drawing more in detail, and first to Fig. 1, a meter 10 is illustrated which is shown as conventionally including a lower lidded box 11 containing the main fuse or fuses and accessible to the patron of the electric company for fuse changing, and an upper poortion or compartment 12 for the current consumption measuring and registering mechanism. The compartment 12 is seal-locked, and openable only by an authorized representative of the electric company.

In the meter shown, one common in household installations, the sides and front of the compartment 12 are provided by a one-piece cup-like glass member held in place by a pair of posts 13 fixed to and upstanding from a metal back wall. These posts are threaded at their upper ends where they project through suitable apertures in said glass member; so that when wing-nuts 14 are screwed up on said posts, and a rod 15 is sent through apertures in one of the wings of each nut, such nuts cannot be reversely turned. To prevent unauthorized removal of the rod it is headed at one end as indicated at 16 and apertured near its other end, through which aperture and the rod receiving aperture in the wing of the adjacent nut a wire 17 is passed, its ends intertwisted, and a lead seal 18 applied to such twist.

An outer wall of the premises where the meter is installed is indicated at 19, the two wires to the meter are respectively marked 20 and 21, and the two wires from the meter are respectively marked 22 and 23. As is customary, the wires 20 and 21 are shown as contained in metal conduits 26 and 27 to a point beyond the side of the wall 19 facing the cellar or other interior part of the premises where the meter is installed.

Since wire tapping is possible only along the length of the wires 20 and 21 beyond the conduits 26 and 27, or wherever else ahead of the current consumption measuring and registering mechanisms of the meter said wires are exposed, as, for instance, over the short lengths thereof between the fuse or fuses in the box 11 and points of entry of said short lengths into the compartment 12, use of the compositely sheathed wire of the invention may be limited to the parts of the circuit just mentioned.

Referring to Fig. 2, the compositely sheathed wire according to the invention as there shown and marked generally 28 is illustrated as comprising, as usual, the central current conducting wire 29, the surrounding sheath 30 of rubber or like insulation, and an outer cover 31 indicated here as of the familiar tubular braiding. However, interposed between the sheath 30 and the cover 31 is the short-circuiting conductor aforesaid. This is marked 32, and preferably is arranged sleevingly of the sheath 30; and the same is cross-sectionally indicated by dotted lines to indicate that it may be granular, flaky or otherwise constituted than as a continuously smooth foil, film or coating. For clarifying the drawing, relative dimensions have been disregarded, and some spacing is shown between the elements 30 and 32 and between the elements 31 and 32. There is no need for any such spacings, nor are they advantageous. In making the new compositely sheathed wire, standard manufacturing methods may be employed, except that between the step of applying the sheath 30 to the wire 29 and that of finally applying the cover 31, the short-circuiting conductor 32 is applied to the sheath 30.

Referring to Fig. 3, where the compositely sheathed wire 29 is shown cross-sectionally, the tapping implement 33 there shown is of the pliers type having a pair of metal members interpivoted at 34 to provide a pair of manipulable arms carrying spaced handles 35 of insulating material and to provide at the working end of the implement a bearing plate 36 and a sharply pointed piercing prong 37. When the implement 33 is applied as illustrated, in the usual case in regard to an ordinary wire protected by an outer structure merely including parts corresponding to the sheath 30 and the cover 31, forcing the handles 35 toward each other results in the prong 37 piercing sheath and cover and digging into the contained conducting wire to make good contact therewith; whereupon the parts are locked in this relation by tying, taping or clamping the handles together as by means engaging metal rings 38 set into such handles. Soldered or otherwise suitably attached to the implement 33 is a wire 39. Two such implements are of course employed, one for the tapping into of what is ordinarily called the positive wire at a point ahead of the kw. h. measuring and registering mechanisms of the meter, and the other for tapping into what is ordinarily called the negative wire at a point also ahead of such mechanisms. Then, by aid of the wire 39, and the corresponding wire of the other element, electric current may be used, without affecting the said mechanisms.

Use of implements of the general class of the implement 33 is favored for the surreptitious appropriation of electric current, as the piercing effected by the prong 37 is difficult to locate after such an implement has been removed, in anticipation of a visit from a lighting company inspector.

In Fig. 3, the implement 33 is illustrated as it would have to be used in attempting to tap into a compositely sheathed wire according to the invention. The prong 37, the instant it touches the conducting wire 29, bridges that wire and the circuit-breaking conductor 32. How this may be utilized in attaining the ultimate object of the invention will now be explained.

One such use of the invention is shown in Fig. 4. Here, at 40, is indicated a casing which contains a circuit breaker of any desired type, having terminals 41 and 41'. Such circuit breaker when actuated operates to break a part of the main circuit coupling the contacts 42 and 42'.

Wires corresponding to the wires 20 and 21 of Fig. 1 are here marked 28A and 28B, since the latter are like the wire 28. The wires 28A and 28B are so inserted into the compartment 12 of the meter that their covers 31 are undisturbed exterior to said compartment; but before the wires are inserted in the compartment 12 said covers 31 at the ends of the portions of the wires to be thus inserted are removed to expose the short-circuiting conductors 32. To interpose the circuit breaker for coaction with one side of the main circuit, one of the wires 29 is connected to the terminal 42, and from the other terminal 42' another wire 43 is connected to the current consumption measuring and registering mechanisms; while the other wire 29 is direct connected to said mechanisms. To one of the terminals 41 and 41' is connected a wire 44, and to the other of said terminals is connected a wire 45. The wire 44 is connected to the short-circuiting conductor 32 of the wire 28A as by a clip 46, and the wire 45 is connected to the short-circuiting conductor 32 of the wire 28B as by a clip 47.

Thus, when any attempt is made to tap the wires 28A and 28B, as by piercings as described, or even by scraping away a part of the protective portions 30 and 21 of said wires, inevitably the two short-circuiting conductors 32 are conductively coupled each to its associated wire 29; with the result that the circuit breaker is actuated by current in a circuit including one of the wires 29, its associated conductor 32, one of the clips 46 and 47, a wire 44 or 45, the circuit breaker, the other of the two wires last-mentioned, the other one of said clips, the other one of the conductors 32, and the associated wire 29. As will be understood, the circuit breaker is of a type well understood in the electrical art, and so operating that on setting up the circuit just described the circuit breaker will operate to break the main circuit.

Variations and modifications are within the scope of the invention; and parts of the improvements may be used without others. The scope of the invention is particularly defined by the appended claims, interpreted as broadly as is consistent with the prior art.

I claim:

1. A protective apparatus for the purpose described, comprising an electric current supply circuit including a first pair of conductors, one a current supply one and the other a current return one, and also including a second pair of conductors, one a current supply one and the other a current return one, each of the conductors of said first pair being part of a cable wherein said part as the main electric conductor thereof is enclosed by an insulating wall and said insulating wall is enclosed by a second insulating wall and a conductive wall is interposed between said two insulating walls; a current consumption registering meter interposed between said first pair of conductors and said second pair of conductors whereby normally said meter registers the current consumption by way of said circuit; a sealed casing structure for enclosing said meter; and a normally inoperative means for breaking said circuit between said first pair of conductors and said second pair of conductors, said means having electric terminals each connected to the conductive wall of a different one of the cables of the said first pair of conductors, whereby when the two conductive walls last-named are bridged by a conductor brought into contact with both said walls said means is rendered effective to break said current supply circuit, said means also enclosed in said casing structure.

2. The apparatus of claim 1, wherein the conductive connections between the last-named two conductive walls and said terminals are enclosed in said casing structure.

DAVID TROMPETER.

REFERENCES CITED

The following references are of record in the file of this patent:

UNITED STATES PATENTS

| Number | Name | Date |
|---|---|---|
| 2,059,178 | Schatzel | Oct. 27, 1936 |